United States Patent [19]

Reisenweber

[11] Patent Number: 4,818,910
[45] Date of Patent: Apr. 4, 1989

[54] COMMUTATOR MOTOR WITH AN INSULATING COVER FOR THE ROTOR SHAFT

[75] Inventor: Walter Reisenweber, Mellrichstadt, Fed. Rep. of Germany

[73] Assignee: Siemens Aktiengesellschaft, Berlin & Munich, Fed. Rep. of Germany

[21] Appl. No.: 96,691

[22] Filed: Sep. 14, 1987

[30] Foreign Application Priority Data

Sep. 19, 1986 [DE] Fed. Rep. of Germany ....... 3631943

[51] Int. Cl.[4] .................. H02K 1/22; H02K 5/16; H01R 39/16
[52] U.S. Cl. ........................... 310/233; 29/597; 310/42
[58] Field of Search ............. 29/597, 598; 310/42, 310/43, 233, 234, 235, 236

[56] References Cited

U.S. PATENT DOCUMENTS

| | | | |
|---|---|---|---|
| 3,213,307 | 10/1965 | Summerfield | 310/234 |
| 3,917,967 | 11/1975 | Robison et al. | 310/43 |
| 4,121,127 | 10/1978 | Adelski et al. | 310/42 |
| 4,199,861 | 4/1980 | Buckman et al. | 310/42 |

FOREIGN PATENT DOCUMENTS

| | | |
|---|---|---|
| 1010624 | 1/1955 | Fed. Rep. of Germany . |
| 7931678 | 2/1980 | Fed. Rep. of Germany . |
| 8428085 | 8/1985 | Fed. Rep. of Germany . |
| 1549359 | 12/1968 | France . |
| 2170835 | 9/1973 | France . |

OTHER PUBLICATIONS

Patent Abstracts of Japan (56-49651 dated May 6, 1981), vol. 5, No. 109, Jul. 15, 1981.

Primary Examiner—Patrick R. Salce
Assistant Examiner—D. L. Rebsch
Attorney, Agent, or Firm—Kenyon & Kenyon

[57] ABSTRACT

In order to insulate in a simple manner the basically bare rotor shaft region between the one rotor stack end face (21) and the oppositely located commutator end face (51) at its circumference, a sleeve (4) which can be upset (collapsed) axially, is fabricated as a unitized part and is formed preferably integrally at the collar (31) of the insulating end disc (3) covering the rotor stack end face (21), is put on before the commutator (5) is pressed on, and is axially collapsed when the commutator (5) is pressed on.

7 Claims, 1 Drawing Sheet

COMMUTATOR MOTOR WITH AN INSULATING COVER FOR THE ROTOR SHAFT

BACKGROUND OF THE INVENTION

The invention relates to a commutator motor with an insulating cover for the rotor shaft.

It is known, for instance, from DE-GM No. 18 38 776, that, after taking into consideration the respective tolerances of the individual parts, in order to achieve a defined axial play in the rotor support of a miniature motor, the axial distance between the axially outer end face of the commutator and the rotor stack end face facing away from the commutator or the insulating end washer, which may optionally cover this end face, should be constant. This necessitates that after the rotor stack is fastened to the rotor shaft and optionally, the insulating end washers are slipped on, the commutator is pressed to a different axial depth, corresponding to the compensation of the tolerances, onto the uninsulated rotor shaft end; then, there remains, as a rule, a rotor shaft region which is different from motor to motor, which depends in each case on the tolerances of the assembled rotor parts, and which is basically uninsulated. This rotor shaft region extends between the one rotor stack end face and the opposite commutator end face. If there is a danger, expecially if the commutator is contacted with the so-called backside winding technique, preferably in connection with angled rotor lamination stacks, that this bare rotor shaft region may be touched by the winding wires between the coil heads of the rotor winding and the hooks of the commutator, this rotor shaft region must be electrically insulated at its outer circumference. In the known case the electrical insulation is done after the commutator is secure at the correct distance by wrapping the bare rotor shaft region with insulating tape by hand.

SUMMARY OF THE INVENTION

It is an object of the present invention to provide, while maintaining high operating safety, a simple electrical insulation, suited particularly well for automatic production, of the rotor shaft region required for compensating tolerances and to thereby substantially reduce the cost of assembly.

In a commutator motor of the type mentioned at the outset, the solution of this problem is possible, according to the invention, by providing a separate insulating sleeve as the insulating cover, which insulating sleeve may be upset in the axial direction.

With the commutator motor according to the invention, it is advantageously possible, particularly for automated production, to bring the sleeve, which can be produced as a unitized part, onto the rotor shaft by means of a simple automated slip-on motion and, matching the different tolerances that may occur from motor to motor, to offset the unitized-part sleeve in one operation corresponding to the dimensionally accurate pressing-on of the commutator. Advantageously, such a sleeve is designed as a part closed in the circumferential direction and is slipped axially onto the rotor shaft.

The number of manufacturing steps can advantageously be reduced further by forming the axially upsettable sleeve at the insulating end washer or its collar in one piece, so that it can be assembled simultaneously with the insulating end washer in one operation.

Due to the fact that the sleeve is provided with a wall thickness radially reduced relative to the collar, an unequivocal separation of functions between the axially stiff collar on the one hand and the sleeve which can be adapted in length and can be upset with little pressure on the other hand in a simple but reliable manner is assured with the production-wise advantageous one-piece design. According to a further embodiment of the invention, the axially upsettable sleeve is provided at its commutator-side end with a wall thickness radially reduced relative to the end on the rotor stack side, especially with a gradual transition, so that the upset sleeve part is essentially located in front of the commutator end face and can thus not interfere with the formation of the coil heads.

The invention, as well as further advantageous embodiments, will be explained in greater detail in the following detailed description with reference to an embodiment as shown schematically in the accompanying drawings.

BRIEF DESCRIPTION OF THE DRAWINGS

FIG. 1 shows, in an axial longitudinal section, a rotor arrangement of a commutator motor with a sleeve which is formed at the collar of an insulating end disc in one piece and is axially upset while the commutator is slipped on;

FIG. 3, illustrates the end of the rotor arrangement on the commutator side according to FIG. 1, but before the sleeve is upset by the commutator which is to be pressed-on.

DETAILED DESCRIPTION

Figure 1:
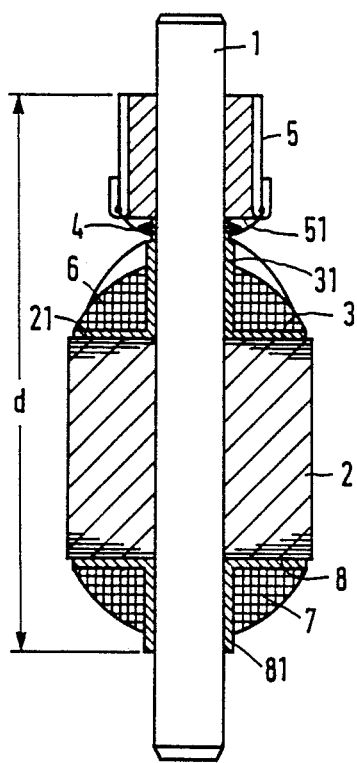

FIG. 1 shows the rotor arrangement of a commutator motor. The rotor shaft 1 which is rotatably supported via bearings, not shown here, carries a rotor stack 2 and a commutator 5. To the hooks of the commutator 5 are connected winding ends of the wound rotor winding, of which the coil heads 6, 7 at the end face are shown in FIG. 1. Of the winding connections leading to the commutator, only the leads to two commutator hooks are shown in FIG. 1; due to the backside winding technique provided here, for which the insulation according to the invention, of the bare rotor shaft region is particularly well suited, a winding wire brought out from a slot of the rotor stack 2 is led to a commutator hook which is arranged opposite a slot offset at the circumference by about 180°.

For the electrical insulation of the coil heads 6, 7 from the end faces of the rotor stack 2 and from the rotor shaft 1 radially below the coil heads 6, 7, insulating end discs 3, 8 with radially formed-on sleeve-shaped collars 31, 81 surrounding the rotor shaft 1 in the vicinity of the coil heads 6, 7 are provided. At the free axial end of the collar 31 of the one insulating end disc 3, a sleeve 4 is integrally formed which can be set-off axially and serves, according to the invention, for insulating the remaining bare rotor shaft region between the commutator 5 and the collar 31, and which can be matched in length due to its capability of being upset or axially collapsible, as will be described in more detail below, up to the longitudinal mounting dimension d when the commutator is pressed on.

Figure 2:
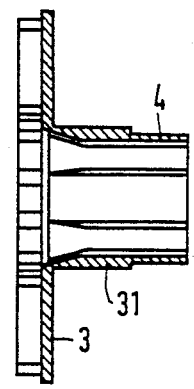
FIG. 2, is a more exact detailed enlargement of a portion of FIG. 1, and illustrates an axial longitudinal section through the insulating end disc with the collar and an integrally formed-on sleeve which can be upset axially.

FIG. 2 shows, in an enlarged detail view, a sleeve 4 which is integrated, formed at the collar 31 of the insulating end disc 3, and the radial wall thickness of which is reduced from that of the collar 31.

Figure 3:
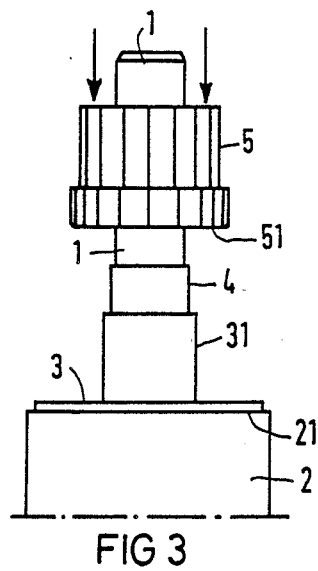
Figure 4:
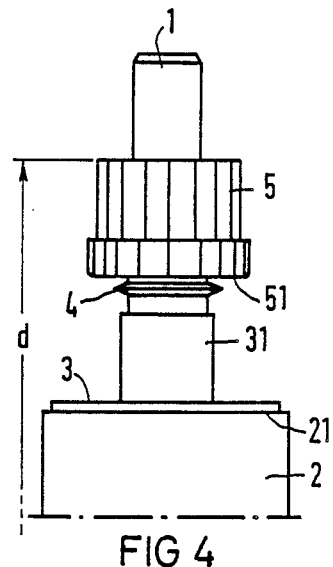
FIG. 4 illustrates the end of the rotor arrangement on the commutator side according to FIG. 1 after the sleeve is upset by the commutator pressed on the rotor shaft.

FIGS. 3 and 4 show in a detailed portion of the rotor arrangement according to FIG. 1, the process of slipping-on the commutator 5 and of the simultaneous upsetting of the sleeve 4. FIG. 3 shows the condition of the commutator 5 which has just been slipped on the rotor shaft 1 and is being moved toward the sleeve 4 in the direction of the arrow. During further axial pushing-on of the commutator 5, the sleeve 4 is then upset by being automatically axially collapsible as clearly illustrated in FIG. 4, until the commutator 5 has reached its end position corresponding to the longitudinal mounting dimension.

What is claimed is:

1. In a commutator motor including an insulating cover for the rotor shaft in the region between an insulating end disc covering an end face of the rotor stack and the opposite commutator end face, an improvement characterized by an automatically axially collapsible sleeve being closed in the circumferential direction to provide said insulating cover around the rotor shaft, said sleeve comprising a separate part arranged between the insulating end disc and the opposite commutator end face and the automatically axially collapsible sleeve being automatically collapsed in the axial direction by axial displacement of at least one of the rotor stack and commutator during the assembly of the rotor stack and commutator on the rotor shaft to adapt the overall length of the rotor stack, commutator and sleeve on the rotor shaft to a preselected length.

2. In a commutator motor including an insulating cover for the rotor shaft in the region between an insulating end disc covering an end face of the rotor stack, which end disc includes a formed-on axially projecting sleeveshaped collar surrounding the rotor shaft and the opposite commutator end face, an improvement characterized by said insulating cover between the collar surrounding the rotor shaft and the opposite commutator end face comprising an automatically axially collapsible separate sleeve being closed in the circumferential direction to surround the rotor shaft in the region opposite the commutator end face and, further, being automatically collapsed in the axial direction by axial displacement of at least one of the rotor stack and commutator during the assembly of the rotor stack and commutator on the rotor shaft to adapt the overall length of the rotor stack, commutator and sleeve on the rotor shaft to a preselected length.

3. In a commutator motor with an insulating cover for the rotor shaft in the region between an insulating end disc including a formed-on axially projecting, sleeve-shaped collar surrounding the rotor shaft and the opposite commutator end face, an improvement characterized by said insulating cover between the collar and the opposite commutator end face comprising an automatically axially collapsible sleeve which is closed in the circumferential direction to surround the rotor shaft, said sleeve being integrally formed on said collar and said sleeve being automaticlly collapsed in the axial direction by axial displacement of at least one of the rotor shaft and commutator during assembly of the rotor stack and commutator on the rotor shaft to adapt the overall length of the rotor stack, commutator and sleeve on the rotor shaft to a preselected length.

4. The commutator motor according to either of claims 1, 2 or 3, wherein said sleeve is closed in the circumferential direction and is slipped on said rotor shaft axially from its free end.

5. The commutator motor according to either of claims 2 or 3, wherein said axially collapsible sleeve is provided with a radial wall thickness which is less than the radial wall thickness of said collar.

6. The commutator motor according to claim 3, wherein said axially collapsible sleeve is provided at its end which is opposite said commutator end face a radial wall thickness which is less than the radial wall thickness at its end opposite said collar.

7. The commutator motor according to claim 6, wherein the radial wall thickness of said axially collapsible sleeve being progressively changed between its end opposite said commutator end face and its end opposite said collar.

* * * * *